United States Patent [19]
Mednick

[11] 3,976,525
[45] Aug. 24, 1976

[54] METHOD OF MAKING A NEEDLED SCOURING PAD
[75] Inventor: Edward Mednick, Skokie, Ill.
[73] Assignee: Fiber Bond Corporation, Chicago, Ill.
[22] Filed: Oct. 24, 1974
[21] Appl. No.: 517,444

Related U.S. Application Data
[62] Division of Ser. No. 387,329, Aug. 10, 1973, Pat. No. 3,862,522.

[52] U.S. Cl. .............................. 156/72; 15/209 R; 51/295; 51/297; 51/298 A; 156/148
[51] Int. Cl.² ...................... B24D 3/32; B24D 3/34; B32B 5/06
[58] Field of Search ................ 156/72, 92, 93, 148, 156/153, 250, 251, 252, 253, 261, 298, 303; 264/45.1; 51/295, 296, 297, 298, 400, 401, 407; 15/209 R, 225, 226, 230.17, 230.18, 23.19, 244 R, 244 B

[56] References Cited
UNITED STATES PATENTS
2,958,593 11/1960 Hoover et al. ..................... 15/209
3,156,242 11/1964 Crowe ............................... 156/72
3,307,990 3/1967 Homier et al. ..................... 156/72
3,674,618 7/1972 Spann ............................... 156/72
3,686,046 8/1972 Crowley ............................ 156/72

Primary Examiner—Caleb Weston
Attorney, Agent, or Firm—Dressler, Goldsmith, Clement, Gordon & Shore, Ltd.

[57] ABSTRACT

A composite scouring pad is prepared comprising a non-woven layer and a flexible foam layer in juxtaposition to each other, the flexible foam being needled to the nonwoven layer by fibers from the non-woven layer which pass through the foam layer and emerge from its opposite side. The opposite side of the foam layer is coated with a resinous layer which anchors the emergent fibers thereon, the fibers providing a desired roughness to said side, making said side suitable as a scouring surface. The non-woven layer is impregnated with a resin and, in the preferred embodiment, with abrasive particles to provide a second scouring surface.

2 Claims, 5 Drawing Figures

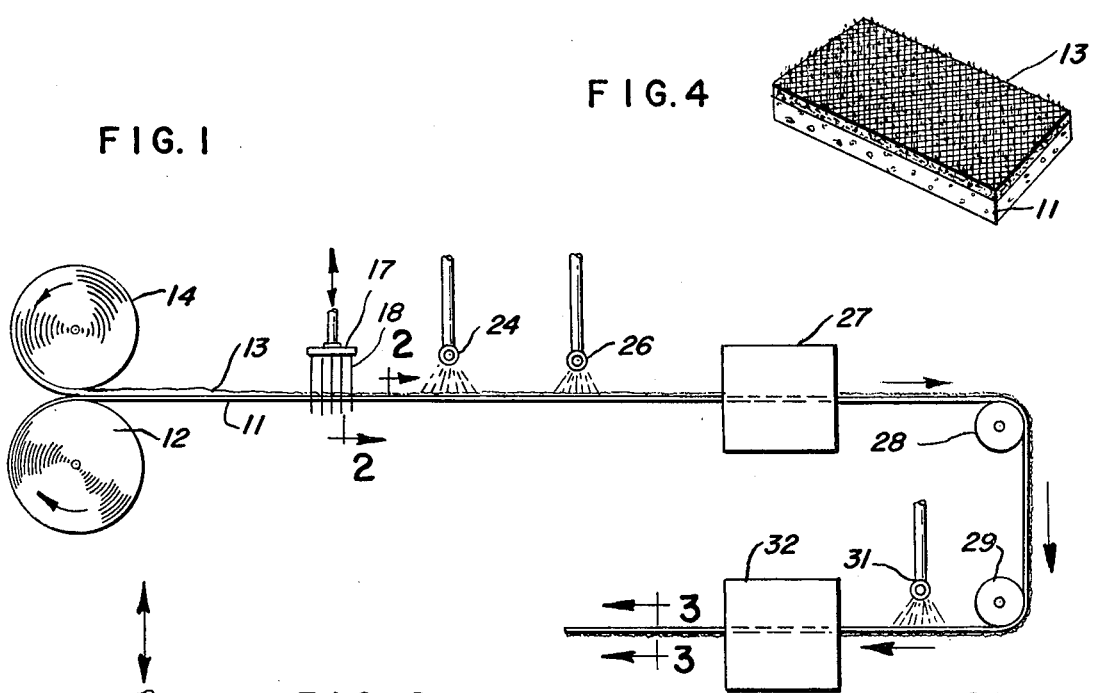
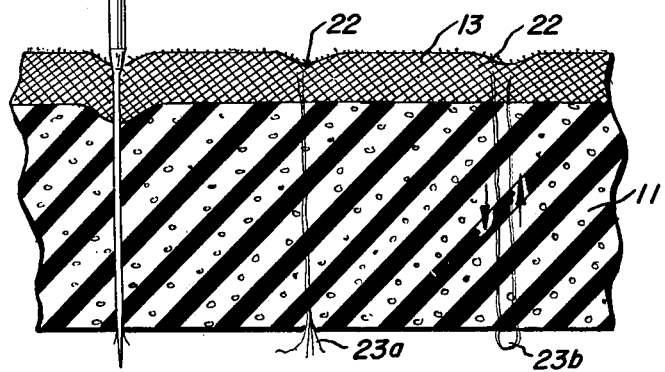
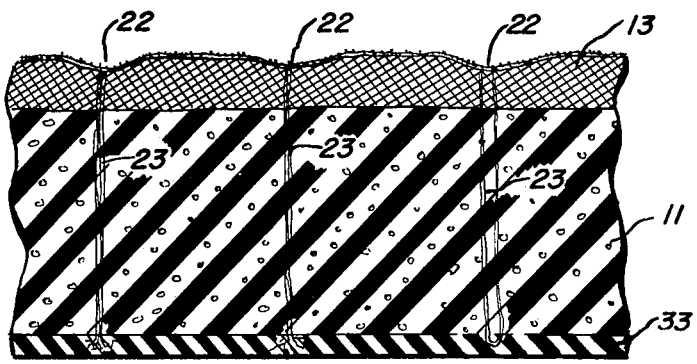
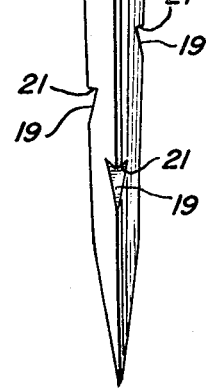

METHOD OF MAKING A NEEDLED SCOURING PAD

This is a division of application Ser. No. 387,329, filed Aug. 10, 1973, U.S. Pat. No. 3,862,522.

BACKGROUND OF THE INVENTION

Scouring pads for the cleaning of pots and pans have been in use for a number of years. Scouring pads are used to bring a scouring surface of desired roughness and/or abrasiveness into contact with the soiled surface of a pot or pan. The body of the scouring pad is easily deformable to permit the surface of the pad to conform to the surface of the pot or pan being cleaned and is also of porous construction to provide a water-holding capacity so that water or soap solution is continuously supplied to the cleaning surface.

The surface of a scouring pad is desirably of sufficient roughness or unevenness and of sufficient toughness to facilitate the removal of large, loosely held food deposits from the surface of the pot or pan. The surface should also have sufficient abrasiveness to facilitate the removal of hard, low volume deposits which adhere strongly to the inner surfaces of pots or pans having metallic or vitreous surfaces. Pots or pans having non-sticking surfaces of Teflon or of some other non-wettable resin cannot be scoured with an abrasive surface without damage to the surfaces and have no need for scouring with an abrasive surface because the food deposits thereon are not strongly adherent.

In general, the scouring pads available have been designed either with an abrasive surface for the treatment of pots and pans having metallic or vitreous surfaces, or with a roughened non-abrasive surface for the treatment of pots and pans having resinous non-sticking surfaces.

One early form of pot cleaning pad which is still in use is a pad made of steel wool fibers. Steel wool fibers provide abrasiveness suitable for metallic and vitreous pots and pans and have suitable water-holding capacity and conformability. Steel wool pads do not have surfaces of sufficient roughness for the effective cleaning of bulky food deposits. In addition, they cannot be used on Teflon-coated pots and pans and are also subject to rusting which shortens their effective life.

To provide desirable roughness to steel wool, scouring pad structures are utilized which are made in accordance with Winston U.S. Pat. No. 3,182,346 and which have a corrugated metallic wool layer adhered to a flexible foam layer. Such pads cannot be used safely on resinous non-sticking surfaces, such as Teflon-coated pots and pans because the metallic wool surface is too abrasive and the flexible foam surface is too soft and smooth.

Scouring pads have also been made in accordance with Politzer U.S. Pat. No. 3,080,688 and having a lofty, open, non-woven fibrous web bonded to a cellulose sponge layer. The non-woven fibrous layer preferably has abrasive particles adhered to its fibers in the manner described in Hoover U.S. Pat. No. 2,958,593.

Such pads are disclosed as being made by bringing together a non-woven fibrous web and a layer of sponge-forming mass so that some of the fibers of the web become embedded in the sponge as it solidifies. Such penetration of fibers into the sponge, however, is relatively shallow penetration which, while it provides good adhesion between the two layers, does not provide protection against the delamination of the sponge layer at a depth beyond the penetration of the web fibers. In addition, the method described requires that the pads be fabricated only by those who have facilities for the in situ production of foam.

Other scouring pads have been made by adhering a lofty, open, non-woven fibrous web containing abrasive particles to a cellulose sponge layer, or a flexible polyurethane sponge layer by a layer of adhesive. Such pads cannot be used on Teflon-coated pots and pans and are also subject to possible separation in use by reason of an improperly cured adhesive layer, or by reason of delamination of the sponge, itself.

Some scouring pads have been designed specifically for use on Teflon-coated pots and pans, utilizing scouring surfaces which contain no abrasive particles. One type of pad for this purpose is an open non-woven web of coarse nylon monofilament which has the desired rough surface and the desired toughness, but very little water-holding capacity. Other pads for Teflon-coated pots and pans utilize a coarse, open woven or non-woven web of nylon or other tough fiber either wrapped around, or adhered to a cellulose or flexible polyurethane foam. Such pads have adequate water-holding capacity but, because of the lack of abrasive particles, are of limited effectiveness in the removal of hard, adherent, soil from metallic or vitreous pots and pans.

One scouring pad designed to be used on different types of surfaces is the pad disclosed in Klein U.S. Pat. No. 3,175,331. The Klein pad comprises two non-woven fibrous batts having resin-coated fibers, the batts being heat-sealed to each other at their edges and a bar of soap in the sealed space between the batts. One batt may, if desired, have abrasive particles while the other batt is free of such particles to make the pad suitable for use on surfaces of different types. This pad is limited in conformability and in water-holding capacity and is subject to the possibility of coming apart at the edges in rough use.

SUMMARY OF THE INVENTION

In accordance with the present invention there is provided a composite scouring pad and a method for making it. The scouring pad comprises a lofty non-woven fibrous layer and a flexible foam layer in juxtaposition to each other. Fibers from the non-woven fibrous layer pass through the flexible foam layer and emerge from its opposite side. A resin coating on the opposite side anchors the emergent fibers thereon to provide a lock against delamination of the pad, the fibers providing a desired roughness on the surface of said opposite side, suitable for a scouring surface, and the resin providing a desired toughness on the surface. The non-woven fibrous layer is impregnated with a resin and, if desired, with abrasive particles to provide a second scouring surface.

The composite scouring pad of this invention is made by a method comprising bringing a flexible foam layer and a lofty non-woven fibrous layer into juxtaposition to each other, passing a plurality of barbed needles through the juxtaposed layers from the fibrous layer side to pass a plurality of fibers from said fibrous layer completely through said foam layer to emerge on the opposite side thereof, and thereafter coating the exterior surface of said foam layer and the fibers emerging therefrom with a tough resinous material and coating the fibers of the fibrous layer with a binder, preferably containing abrasive particles.

BRIEF DESCRIPTION OF THE DRAWINGS

FIG. 1 is a schematic side elevation of equipment for the preparation of the product of this invention and for the practice of the method of this invention;

FIG. 2 is an enlarged, fragmentary, cross-sectional view of the product of this invention during an interim stage of its preparation, specifically at plane 2—2 of FIG. 1;

FIG. 3 is an enlarged cross-sectional view of the product of this invention at plane 3—3 of FIG. 1;

FIG. 4 is a perspective of the scouring pad of this invention; and

FIG. 5 is an enlarged, broken perspective of a barbed needle suitable for use in the method of this invention.

DETAILED DESCRIPTION

As may be seen from FIG. 1, the scouring pad of this invention is made from a flexible foam layer 11 fed from roll 12 to a horizontal path moving toward the right as shown in FIG. 1.

Air-laid non-woven web 13, comprising non-absorbent and non-matting staple fibers arranged in a three-dimensional, random arrangement, is fed from roll 14 into juxtaposition with foam layer 11. Web 13 is a lightweight open web composed of textile length polyester fibers.

Juxtaposed layers 11 and 13 pass under reciprocating punch 17 which contains closely spaced needles 18, each containing a plurality of notches 19 which produce barbs 21 (FIG. 5) which catch individual fibers in web 13 as the punch moves downward and passes the fibers completely through the flexible foam layer.

FIG. 2 shows schematically at the left side the passage of a barbed needle through juxtaposed layers 13 and 11 from the free surface of fibrous layer 13 through the free surface of foam layer 11. Withdrawal of the needle leaves non-woven web fibrous layer 13 somewhat flattened, produces a plurality of craters 22 on the outside surface of the non-woven fibrous web and a plurality of emergent fibers on the outside surface of foam layer 11, some fibers being free end fibers, as shown at 23a and some being looped fibers, as shown at 23b. Withdrawal of the barbed needles from their lowermost position releases some of the fibers caught near their ends in the needle notches, leaving the free ends of the released fibers emergent from the free surface of the foam layer. The withdrawal of other needles is accompanied by the entrapment of fibers in the needle notches and pulls the fibers back into the foam layer leaving looped ends of the fibers emergent from the free surface of the foam layer.

The needled layers then pass under spray nozzle 24 from which a fine spray of a binder material is directed toward and into the non-woven web. A suitable binder material is a latex of a melamine-formaldehyde resin.

Additional binder material, in this case containing a bentonite thickener and finely divided silica particles as abrasive, is applied to the non-woven web as it passes below spray nozzle 26.

The needled composite is then passed into and through curing oven 27 in which it is heated to solidify the binder deposited on the fibers of the non-woven web. The web then passes around rollers 28 and 29 to reverse its direction of movement and to locate the foam side of the composite uppermost. Another binder material is then sprayed onto the free surface of the foam layer through spray nozzle 31 to cover the entire foam surface including the emergent fibers thereon.

The composite then passes through oven 32 for final curing to produce the product shown in FIG. 3 in which the fibers of non-woven web 13 are coated with a binder material containing abrasive particles and in which fibers 23 from the non-woven web pass through the foam layer and are anchored at its opposite surface in cured resin layer 33.

After the composite is cured in oven 32 it may be cut into segments of a size suitable for scouring pads and the pads packaged for sale.

When the scouring pads are used on hard-surfaced pots and pans such as those having metallic or vitreous surfaces, the abrasive-coated side of the pad is applied to the inner pot surfaces. This surface has roughness due to its open structure and due to craters 22 formed in the needling step. It also has abrasiveness and toughness by reason of the coating of the fibers with the abrasive-containing binder.

When the pads are used on Teflon-surfaced pots and pans, they are reversed so that the resin-coated foam layer is brought into contact with the surface to be cleaned. The surface is tough and resistant to abrasion during the scouring process because of the tough resin coating; and it is rough and effective in cleaning because the resin coating covers the emergent fiber ends.

In either use of the pad, flexible foam layer 11 provides excellent water-holding capacity to keep a desired wetness on the surface being scrubbed.

In a specific embodiment of this invention, the foam layer is a flexible polyurethane foam of ⅜ inch thickness weighing 7.2 oz./sq.yd. and the non-woven fibrous layer weighs 3.0 oz./sq.yd. and is made of 15 denier polyester fibers cut to 1.5 inch lengths.

The spacing of the needles in punch 17 and the number of strokes per minute are adjusted to provide about 80 to 100 needle penetrations per square inch. The resin applied through nozzle 24 comprises about 45 weight percent of polyvinyl chloride, about 45 weight percent of a carboxylated acrylonitrile-butadiene copolymer and about 10 weight percent of a melamine-formaldehyde resin. It is applied at 1.6 oz./sq.yd.

The solids applied through nozzle 26 comprise about 30 weight percent of a melamine-formaldehyde resin, about 35 weight percent of fine silica sand and about 35 percent of finely divided silicon carbide. These solids are applied at about 5.6 oz./sq.yd.

The resin applied to the foam surface by nozzle 31 is a styrene-butadiene copolymer and is applied at about 1.5 oz./sq.yd.

It is to be understood that numerous departures and modifications are possible within the scope of this invention.

For example, the non-woven layer may be made of any staple fiber which is non-absorbent and non-matting and which has the strength and toughness desired. In place of polyester fibers, other fibers which may be used include nylon, acrylic, modacrylic, polyolefin or polyacetal fibers.

The flexible foam may comprise a cellulose foam or a natural latex foam, for example, in place of the flexible polyurethane foam.

Various binders and abrasive materials may be applied to the non-woven layer, as known in the art, and specifically as disclosed in U.S. Pat. No. 2,958,593 and in U.S. Pat. No. 3,175,331.

Various binders may also be substituted for the styrene-butadiene copolymer applied to the foam layer. The binders should be tough and flexible. Elastomeric binders, including natural rubber, polyisoprene and butadiene-acrylonitrile copolymers are among the suitable binder materials for application to the foam layer.

The non-woven layer in the final product may vary in thickness, as desired, a suitable range being from about 1/8 inch to about 1 inch. The thickness of the foam layer may vary over the same range with the added proviso that the total thickness of the pad be within the range between about 3/8 inch and about 1 1/2 inches.

The fineness or coarseness of the fibers in the non-woven layer may also vary, as desired, depending on the fineness or coarseness desired in the scouring surfaces. A suitable range of fibers is from about 6 to about 200 denier, and preferably from about 10 to about 40 denier.

The number of needle punches can be adjusted as desired depending on the amount of fiber bonding desired and the amount of fibers desired on the foam surface. In general, the range of 20 to 300 needle punches per square inch is suitable, and 60 to 150 needle punches per square inch is preferable.

If desired, an additional layer of material, such as a coarsely woven scrim material may be interposed between the non-woven layer and the foam layer for added strength and stiffness. However, when such a layer is used, its fibers should be spaced from each other sufficiently so that the foam layer and the non-woven layer are in contact with one another over most of the area of the faces in juxtaposition and so that most needle punches will not strike fibers in the interposed layer.

Other modifications and variations will be apparent to those skilled in the art.

What is claimed is:

1. A method of preparing a composite scouring pad which comprises placing a non-woven layer and a flexible foam layer in juxtaposition to each other, passing a plurality of barbed needles through the non-woven layer and thence through the foam layer whereby some fibers from said non-woven layer are passed through said foam layer and emerge from the side of said foam layer opposite said non-woven layer, impregnating said non-woven layer with a resinous binder material containing abrasive particles and coating with a resinous material applied in liquid form the surface of said foam layer opposite said non-woven layer and the emergent fibers thereon, said resinous material being applied in an amount such that the thickness of the coating produced thereby does not impair the roughness of said surface provided by said emergent fibers, whereby said emergent fibers are anchored in position traversing the thickness of said foam layer.

2. The method of claim 1 wherein said resinous material applied to said opposite surface of said foam layer is cured after said application.

* * * * *